(12) United States Patent
Pescod et al.

(10) Patent No.: US 10,191,219 B2
(45) Date of Patent: Jan. 29, 2019

(54) OPTICAL SELECTOR ARRANGEMENT

(71) Applicant: BAE SYSTEMS plc, London (GB)

(72) Inventors: Christopher Ralph Pescod, Chelmsford (GB); Mohammed Nawaz, Chelmsford (GB); Colin James Harper, Chelmsford (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 15/561,175

(22) PCT Filed: Mar. 29, 2016

(86) PCT No.: PCT/GB2016/050871
§ 371 (c)(1),
(2) Date: Sep. 25, 2017

(87) PCT Pub. No.: WO2016/156826
PCT Pub. Date: Oct. 6, 2016

(65) Prior Publication Data
US 2018/0081121 A1    Mar. 22, 2018

(30) Foreign Application Priority Data

Mar. 30, 2015 (EP) ..................................... 15275092
Mar. 30, 2015 (GB) ................................... 1505391.1

(51) Int. Cl.
*G02B 6/36* (2006.01)
*G02B 6/35* (2006.01)
(Continued)

(52) U.S. Cl.
CPC ......... *G02B 6/3504* (2013.01); *G02B 6/3554* (2013.01); *G02B 6/3556* (2013.01);
(Continued)

(58) Field of Classification Search
CPC .... G02B 6/3548; G02B 6/356; G02B 6/3504; G02B 6/3556; H01Q 3/2676; H01Q 3/242
See application file for complete search history.

(56) References Cited

U.S. PATENT DOCUMENTS 4,890,906 A * 1/1990 Wills .................. G02B 6/3504
385/16
4,938,555 A    7/1990 Savage
(Continued)

FOREIGN PATENT DOCUMENTS

DE    19720619 A1    11/1998
EP    0539021 A1    4/1993
(Continued)

OTHER PUBLICATIONS

Arguments as provided by European Counsel to the EPO Searching Authority for PCT Patent Application No. PCT/GB2016/05081, dated Jan. 24, 2017. 7 pages.
(Continued)

*Primary Examiner* — Thomas A Hollweg
*Assistant Examiner* — Mary A. El-Shammaa
(74) *Attorney, Agent, or Firm* — Finch & Maloney PLLC

(57) ABSTRACT

An optical selector arrangement (22), comprising: a first set of optical ports (30), having a first number of optical ports, the first number being greater than or equal to 2; a second set of optical ports (42), having a second number of optical ports, the second number being greater than the first number; the second set of optical ports being for communicating with the first set of optical ports, a selector interface (40) for the optical selector arrangement, the selector interface comprising the second set of optical ports (42), a part of the optical selector arrangement functioning as a selector (44), the selector being arranged to selectively optically couple the first set of optical ports (30) to a set of ports of the second set of optical ports (42) of the selector interface, the selector (Continued)

(44) being rotatable relative to the selector interface (40) to facilitate the selection by optically aligning the first set of optical ports (30) to the second set of optical ports (42) of the selector interface (40); the selector (44) being configured to be continuously relatively rotatable over multiple rotations, to selectively optically couple the first set of optical ports (30) to a different set of ports of the second set of optical ports of the selector interface.

16 Claims, 3 Drawing Sheets

(51) Int. Cl.
  *H01Q 3/26* (2006.01)
  *H01Q 3/24* (2006.01)
(52) U.S. Cl.
  CPC ........... *H01Q 3/242* (2013.01); *H01Q 3/2676* (2013.01); *G02B 6/3512* (2013.01); *G02B 6/3604* (2013.01)

(56) References Cited

U.S. PATENT DOCUMENTS

| | | | |
|---|---|---|---|
| 5,056,886 A | 10/1991 | Hoult | |
| 5,420,946 A | 5/1995 | Tsai | |
| 6,496,618 B1* | 12/2002 | Fernando | G02B 6/3504 356/307 |
| 8,929,696 B1 | 1/2015 | Miglani et al. | |
| 2001/0051016 A1 | 12/2001 | Laor | |
| 2002/0003919 A1 | 1/2002 | Morimoto | |
| 2002/0181874 A1 | 12/2002 | Tulchinsky et al. | |
| 2003/0185487 A1* | 10/2003 | Fernando | G01N 21/255 385/16 |
| 2004/0141680 A1 | 7/2004 | Yoon et al. | |
| 2012/0134622 A1 | 5/2012 | Davis | |

FOREIGN PATENT DOCUMENTS

| | | |
|---|---|---|
| FR | 2529350 A1 | 12/1983 |
| FR | 2581204 A1 | 10/1986 |
| GB | 2178869 A | 2/1987 |
| GB | 2509701 A | 7/2014 |
| WO | 2016156826 A1 | 10/2016 |

OTHER PUBLICATIONS

International Search Report and Written Opinion received for Patent Application No. PCT/GB2016/050871, dated Jun. 24, 2016. 13 pages.
International Preliminary Report on Patentability received for Patent Application No. PCT/GB2016/050871, dated Feb. 24, 2017. 6 pages.
GB Intellectual Property Office Search Report under Section 17(5) received for GB Patent Application No. 1505391.1 dated Oct. 16, 2015. 4 pages.
Extended European Search Report, pursuant to Rule 62 EPC, received for EP Patent Application No. 15275092.3 dated Sep. 8, 2015. 9 pages.

* cited by examiner

OPTICAL SELECTOR ARRANGEMENT

BACKGROUND

The present invention relates generally to an optical selector arrangement, to a system using such an arrangement, and also to related methods.

It is often required to transmit or receive data at high transfer rates. Such transfer rates have led to data transfer being undertaken optically, for example through optical fibre or communication networks, as opposed to the more traditional route of the use of electrically conductive wires or cables or similar.

Sometimes, data can be optically transferred from one location to another with little loss. This is particularly the case if little or no processing of the data is required between the locations. Sometimes, however, processing is required between the locations, and this can lead to losses in a signal that is being transferred between locations. It is of course desirable to minimise such losses where possible.

Take for example an antenna in optical communication (that is, optically coupled) to a beam-forming processor. The amount of data transferred to and from the antenna from the beam-forming network can be significant, and the rate of data transfer can also be significant. Depending on the nature of the antenna and/or beam-forming processor, there may be some form of processing of the signal sent to/received from the antenna, for example in the process of beam steering. Beam-steering could be achieved by selective blocking or unblocking of optical ports that couple the beam-forming processor to one or components of the antenna. However, blocking may lead to significant losses in signal transmission/reception. These losses may be reduced somewhat by replacing the blocking/unblocking arrangement with a non-blocking optical switch arrangement or matrix. However, even with such a non-blocking switch arrangement, losses are still quite significant.

It is an example aim of embodiments of the present invention to at least partially obviate or mitigate one or more disadvantages of the prior art, whether identified above or elsewhere, or at least to provide an alternative to existing optical connector arrangements, related systems and methods.

SUMMARY

According to the present invention there is provided an apparatus and method as set forth in the appended claims. Other features of the invention will be apparent from the dependent claims, and the description which follows.

According to a first aspect of the present invention, there is provided an optical selector arrangement, comprising: a first set of optical ports, having a first number (which may alternatively be referred to as X) of optical ports the first number being greater than or equal to 2; a second set of optical ports, having a second number (which may alternatively be referred to as Y) of optical ports, the second number being greater than the first number, the second set of optical ports being for communicating with the first set of optical ports, a selector interface for the optical selector arrangement, the selector interface comprising the second set of optical ports, a part of the optical selector arrangement functioning as a selector, the selector being arranged to selectively optically couple the first set of optical ports to a set of ports of the second set of optical ports of the selector interface, the selector being rotatable relative to the selector interface to facilitate the selection by optically aligning the first set of optical ports to the second set of optical ports of the selector interface; the selector being configured to be continuously relatively rotatable over multiple rotations, to selectively optically couple the first set of optical ports to a different set of ports of the second set of optical ports of the selector interface.

The optical selector arrangement may further comprise an optical rotating joint having a first portion comprising the first set of optical ports; a second portion comprising a third set of optical ports having the first number of optical ports, the third set of optical ports being optically coupled to the first set of optical ports; the first and second portions being coaxially rotatable relative to one another while maintaining the optical coupling; the first and second portions being coaxially rotatable relative to one another while maintaining the optical coupling; the selector being arranged to selectively optically couple the third set of optical ports of the second portion of the optical rotating joint to the second set of optical ports of the selector interface.

The selector may be rotatable to facilitate the selection, while allowing the first portion of the optical rotating joint, and the selector interface for the optical selector arrangement, to remain stationary.

The selector may have the first number of optical ports, which are optically coupled to the first number of optical ports of the second portion of the optical rotating joint.

The selector may be arranged to rotate coaxially with, and optionally at the same rate as, the second portion of the optical rotating joint.

The selector may be attached to the second portion of the optical rotating joint.

The selector may be the second portion of the optical rotating joint.

A fluid or vacuum may be located in an optical path between the sets of optical ports.

The selector may have a set of optical ports, having the first number of optical ports arranged in an annular configuration, and the optical ports of the selector interface are arranged in an annular configuration.

The selector may be arranged to couple the first set of optical ports to a corresponding number of optical ports in the second set of optical ports.

According to a second aspect of the present invention, there is provided a system comprising the optical selector arrangement of the first aspect of the invention, wherein the system further comprises: a beam-forming processor optically coupled to the first portion of the optical rotating joint; and a transceiver optically coupled to the second number of optical ports of the selector interface.

The transceiver may comprise: an antenna; and/or a phased antenna array. The selector may be arranged to be rotated in order to steer a beam generated by the antenna or a phased antenna array.

According to a third aspect of the present invention, there is provided a method of selectively optically coupling a first set of optical ports having a first number of ports to a second set of optical ports having a second number of ports, the method comprising: selecting which of the second set of optical ports of a selector interface are optically coupled to the first set of optical ports, the selection comprising rotating the selector relative to the selector interface to optically align the first set of optical ports to a subset of the second set of optical ports of the selector interface the subset having the first number of ports, the selector being configured to be continuously relatively rotatable over multiple rotations, to selectively optically couple the first set of optical ports to a different subset of optical ports of the selector interface.

According to a fourth aspect of the present invention, there is provided a method of steering a beam generated by an antenna or a phased antenna array of a beam-forming processor and transceiver system, the system comprising: the optical selector arrangement of the first aspect of the invention; a beam-forming processor optically coupled to the first portion of the optical rotating joint; and a transceiver optically coupled to a second set of optical ports of the selector interface, the transceiver comprising said antenna and/or said phased antenna array; the method comprising: rotating the selector to selectively optically couple a first set of optical ports to a subset of the second set of optical ports of the selector interface, and to thereby steer said beam.

The rotating might comprise continually rotating the selector over multiple revolutions, in order to steer the beam over multiple revolutions.

It should be apparent to the skilled person that one or more features of one or more aspects of the invention may be combined with and/or replace one or more features of one or more other aspects of the invention, unless such replacement and/or combination would be understood by that skilled person to be mutually exclusive from an understanding of the inventive principles as presented in its disclosure. For instance, one or more features described in relation to the optical selector arrangement may of course be used in combination with a system comprising such an arrangement, and related methods.

BRIEF DESCRIPTION OF THE DRAWINGS

For a better understanding of the invention, and to show how embodiments of the same may be carried into effect, reference will now be made, by way of example, to the accompanying diagrammatic Figures in which.

Figure 1:
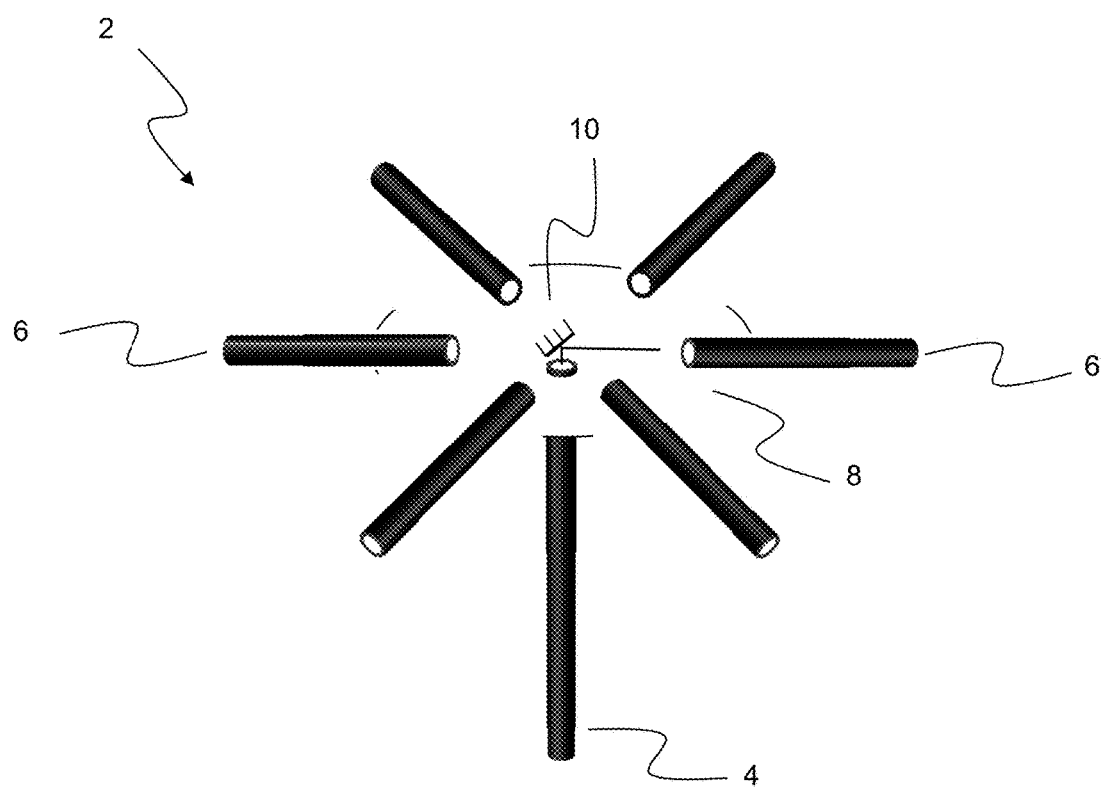
FIG. 1 schematically depicts a basic optical selector arrangement in accordance with an example embodiment.

It should be noted that the Figures have not been presented to or with any particular scale, and are simply given as an aid to understanding the principles underlying and being associated with the presently described inventive principles. The same features appearing in different Figures have been given the same reference numerals for consistency and clarity.

DETAILED DESCRIPTION

According to an aspect of the present invention, there is provided an optical selector arrangement. The arrangement comprises X optical ports. X could be one, or more than one. That is, there could be one or more optical ports. An optical port is anything which allows transmission and/or reception of an optical signal, and could be for instance an optical fibre or part thereof, a connection for an optical fibre, an aperture for optical transmission/reception, a photovoltaic area, and so on. The arrangement further comprises a selector interface for the arrangement. The selector interface comprises Z optical ports. Z could be greater than or equal to X. When equal to X, the selection may function to simply choose how the X ports are coupled the same number of Z ports. When Z is greater than X, the selector can be used to select which subset of Z optical ports the X ports are coupled to. A part of the optical selector arrangement functions as a selector. The selector is arranged to selectively optically couple the X optical ports to X of Z optical ports of the selector interface. In order to achieve this selection the selector is rotatable relative to the selector interface (which includes the selector interface being rotatable relative to the selector) to facilitate the selection, by optically aligning the X optical ports to the X of Z optical ports of the selector interface. Alignment of ports, as opposed to any switching which might be used in the prior art, reduces losses in the optical selection arrangement. The selector is not only rotatable, but is continuously relatively rotatable over multiple rotations, to selectively couple X optical ports to a different X of Z optical ports of the selector interface. This allows complete freedom of rotation between the selector and the interface and any components attached thereto. To this extent, the arrangement provides the same sort of functionality as is present in an optical rotating joint, but with the added benefit of a selection functionality.

FIG. 1 schematically depicts an optical selector arrangement 2 in a relatively simple implementation. The arrangement comprises X optical ports. In this example, X=1, and the single port takes the form of an end of an optical fibre 4. A selector interface is also provided. In this example, the selector interface comprises Z optical ports, with Z=6, and the optical ports take the form of the ends of optical fibres 6. The ports/fibres 4, 6 may be mounted on a housing or other support structure 8 of the selector arrangement 2.

A part of the selector arrangement 2 functions as a selector 10. In this embodiment, the selector 10 is a mirror, but could alternatively be a prism or similar. It can be seen that selector 10 is not connected to the ports/fibres 4, 6, meaning that the selector 10 can be rotated continuously over multiple revolutions without in any way come into contact with, entangling with, or resulting in entanglement of, the ports/fibres 4, 6. This has the advantage of there being no restriction in the direction in which the selector 10 is rotated to implement selection, or the number of times the selector 10 is rotated for such selection.

The selective coupling between port/fibre 4 and a selected one of ports/fibres 6 is achieved by rotating the selector 10 in order to optically align the desired ports/fibres 4, 6. It is important to note that such alignment may not result in actual physical alignment of the ports 4, 6 (e.g. axial or longitudinal alignment), but in that the alignment is such that an optical signal or the like can pass from fibre/port 4 to fibre/port 6.

FIG. 1 shows how a relatively simple optical selector arrangement may be implemented in practice. In one example, the selector can be used to selectively optically couple the light in fibre/port 4 to a selective one of the fibre/ports 6, such that a signal or the light propagating through fibre/port 4 can be optically coupled into and through selected fibre/port 6. It should be immediately apparent that the optical selector arrangement can work in the same physical way, but in reverse in functional terms. That is, if a signal is being passed through or transmitted through each of a number of different fibres/ports 6, the selector 10 can be rotated to ensure that only a particular one of the signals and a particular one of these ports/fibres 6 is optically coupled to the port/fibre 4. That is, the optical selector arrangement 2 can work in two-directions and is a bi-directional selector/selector arrangement in that regard.

The embodiment of FIG. 1, and indeed the inventive concept in general, might perhaps be viewed as somewhat counterintuitive. For instance, it can be seen from FIG. 1 that the fibre/port 4 and the fibres/ports 6, and of course any further objects connected thereto, can remain in a fixed positional relationship with respect to one another, yet at least a part of the optical selector arrangement 2 optically coupling such rotates in order to provide its functionality. This is perhaps counterintuitive in terms of the fact that two fixed objects are coupled by a rotatable member, yet the rotatable member is not present to affect the positional relation of those two fixed objects. Perhaps even more so, optical coupling similar to that shown in FIG. 1 is typically undertaken for opposite reasons, where no selective coupling takes place. That is, typical optical coupling of arrangements similar to that of FIG. 1 allow the input/output optical arrangements, or components to which they are attached, to be able to rotate relative to one another, whilst still maintaining a 1:1 signal optical coupling between specific X optical input ports and specific X optical output ports. For instance, this is exactly what happens in a conventional optical rotating joint.

Figure 2:
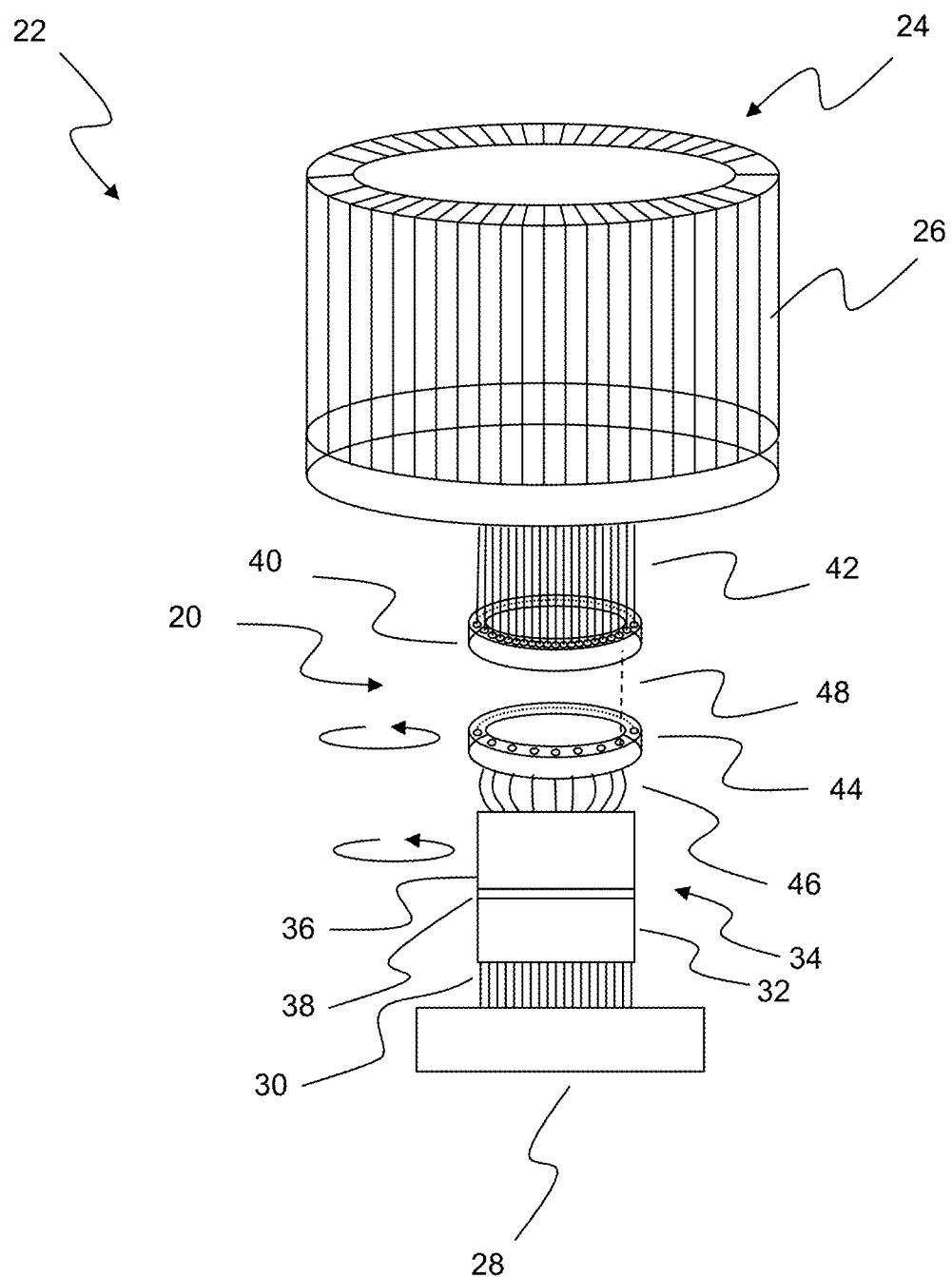
FIG. 2 schematically depicts a more advanced optical selector arrangement in accordance with another example embodiment.
Figure 3:
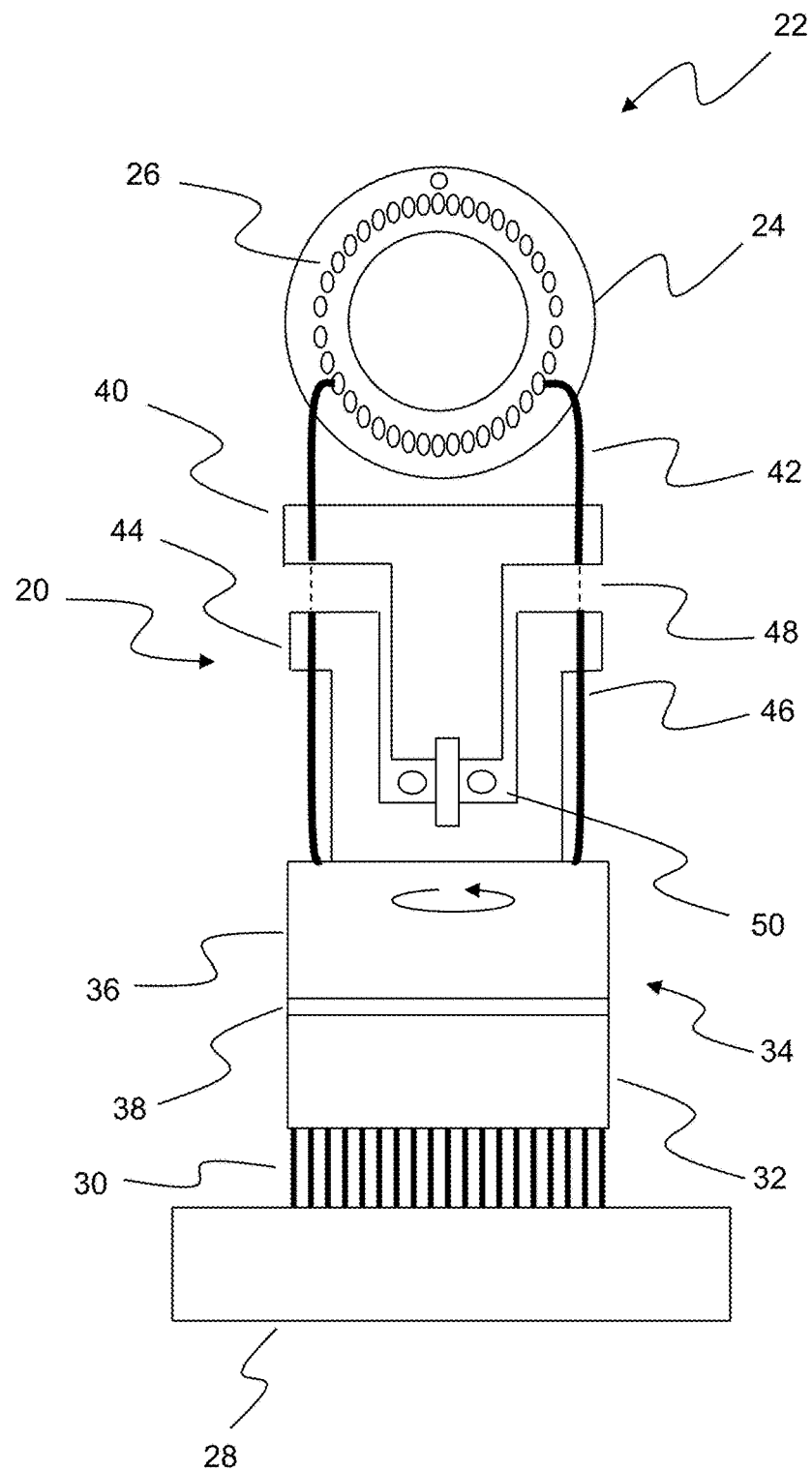
FIG. 3 schematically depicts a different representation of the optical selector arrangement of FIG. 2.

FIG. 1 shows the situation where there is one input/output port 4 and six output/input ports 6. In practice, it may be required to optically couple X ports (in other words input/output ports numbering X, where X is a positive integer) to X of Z ports (in other words input/output ports numbering X and selected from a set of input/output ports numbering Z, where Z and X are positive integers), where X is greater than two and Z is equal to or greater than X. FIGS. 2 and 3 show such an example of this scenario. However, before discussing FIGS. 2 and 3, it is worth providing some context of a prior art scenario. Take for example a cylindrical phased array antenna that is optically coupled to a true time delay optical beam-forming network. The analogue optical beam-forming network generates the required number of amplitude/time weighted RF on fibre outputs that, once connected to the cylindrical antenna, are able to form a beam in a particular direction. For a cylindrical array of, say, Z antenna elements only a sub-set of these antenna elements (that sub-set consisting of X antenna elements) are required to form a beam in a particular direction. If the beam has is to be steered in azimuth the signals from the optical beam-former have to be stepped, one antenna element at a time, to form a beam in a different direction. Conventionally, this is achieved using an optical M×M non blocking switch matrix, but this has been found to introduce an optical loss in the region of dB. As discussed herein, the arrangements of FIGS. 2 and 3 perform the optical selector switch function to enable the steering of the beam in space with a significantly reduced optical insertion loss.

FIG. 2 shows a more complex optical selector arrangement 20 in an overall more complex electro-optical system 22. In this particular embodiment, the system might generally be described as a radar or communications system. The radar or communications system 22 comprises a fixed cylindrical phased antenna array 24 comprising a plurality of transmit/receive modules 26 arranged in an annulus. For example, in an first embodiment there could be 64 transmit/receive modules 26. The antenna array 24 and its modules 26 are optically coupled to a fixed beam-forming processor 28 via optical arrangements that will be discussed in more detail below. It will be understood that "processor" is a general term, and in this example the processor 28 is analogue true time delay optical beam-forming network. Any beam movement is controlled by the rotation by the optical selector of the feeds from the beam-forming processor (network), as opposed to any physical antenna movement.

The beam-forming processor 28 provides X ports (e.g. for inputting or outputting signals to facilitate transmission and/or reception of signals) through X optical fibres 30. The X ports may comprise: one for each of X transmit/receive modules 26 in the antenna array 24 that are required to form a beam (e.g. a radar or communications beam) of a particular configuration; or one for each of all modules 26 with one port of the X output being used for control or alignment of an optical selector arrangement 20 that will be discussed in more detail below.

In the first embodiment where there are 64 transmit/receive modules 26, it is desired that 24 consecutive modules 26 of the total 64 can be connected to the processor 28. Thus, there may be 24 ports at the processor 28 (i.e. X=24), or where an additional channel is desired, there can be 25 ports at the processor 28 (i.e. X=25).

The optical fibres 30 optically couple the beam-forming processor/network 28 to a first portion 32 of an optical rotating joint 34. The optical rotating joint 34 will not be described in significant detail in this disclosure, since its function and operation will be known in the art. For the purposes of this disclosure, it is sufficient to say that the optical rotating joint 34 has a first portion 32 with X optical ports. The X optical ports of the first portion are optically coupled to X optical ports in a second portion 36 via a Dove prism or similar 38. In functional terms, the optical rotating joint 34 allows for the first and second portions 32, 36 to be coaxially rotatable relative to one another, while maintaining the optical coupling of the X optical ports of the first portion 32 and the X optical ports of the second portion 36. This means that objects connected to or forming part of the first or second portions 32, 36 can rotate without affecting the optical coupling between such.

The optical selector arrangement 20 comprises a selector interface 40. The selector interface 40 comprises Z optical ports. Z might be the number of transmit/receive modules 26 in the antenna array 24 (which in the first embodiment is 64, i.e. Z=64), or the number of such modules plus a port for use in aligning or controlling moving parts of the system as a whole (i.e. Z=65), for example movement or alignment of a selector (discussed below). The Z ports of the interface 40 are optically coupled to the transmit/receive modules 26 of the antenna array 24, and any other required or related components, by way of optical fibres 42. The vast majority, and possibly all, of the Z optical ports (and at least the optical ports that are used in beam-forming), are arranged in an annular arrangement with a given diameter, and are evenly distributed at a given interval around the entire periphery of the annular interface 40. The antenna array 24 and interface 40 are fixed in position. The annular arrangement facilitates selection of ports of the Z ports, and thus facilitates forming a beam in certain direction and steering that beam around the fixed antenna array 24, as will be discussed in more detail below.

The selector arrangement 20 further comprises a selector 44 optically coupled to the X optical ports of the second portion 36 of the optical rotating joint 34. Optical coupling is achieved by use of optical fibres 46. The X optical ports of the selector 44 are also arranged in an annular manner, corresponding to the annular configuration of the Z ports of the interface 40, for instance having the same given annular diameter and having X ports distributed at the same given interval, but with the X ports extending only part way around the annular structure of the selector 44. Again, the annular nature facilitates selection by rotation. X optical ports of the selector 44 are optically coupled to X of Z optical ports of the interface 40 via rotation of the selector 44, in order to align the ports across a free space optical link 48. Thus X of Z transmit/receive modules 26 are activated in each aligned position, and as the selector 44 rotates, the activated X of Z commutes.

Although free space is 48 used in an example, other fluids may be used or even a vacuum may be present. A small but finite free space optical link, or similar, avoids any damage that might otherwise be caused by wear and tear between the relatively rotatable interface 40 and the selector 44. Also, the free space link 48, or similar, is an easy way of facilitating selective optical coupling via alignment, for example in contrast with the very specific 1:1 continuous coupling used in typical optical rotating joints via Dove prisms or similar. The free space, or a part thereof, may be used to accommodate beam expansion or collimating optics, if needed or useful, for example a one or more lenses, e.g. one or more graded-index lenses.

The spacing between ports of the interface 40, and spacing between ports of the selector 44, in combination with the (e.g. axial) separation between the interface 40 and selector 44, will be carefully chosen to ensure that there is little or no cross talk between ports that are not to be optically coupled. This ensures that accurate and consistent selection and coupling of the required X of Z ports can be achieved as and where necessary.

Which of X of Z optical ports of the interface 40 are actually coupled to the X optical ports of the selector 44, may be selectively chosen by appropriate rotation of the annular selector 44, to align respective ports with the annular interface 40. As the selector 44 is rotated in a step wise continuous manner, optical coupling is achieved to different (that is, optionally consecutive) X of Z optical ports of the interface 40, and thus certain transmit/receive modules 26 of the antenna array 24. For instance, if X=10 and Z=20, ports 1 to 10 of the selector 44 may be coupled to ports 1 to 10 (of 20) of the interface 40. As the selector 44 is rotated, ports 1 to 10 of the selector 44 may be coupled to ports 2 to 11 (of 20) of the interface 40. As the selector 44 is further rotated, ports 1 to of the selector 44 may be coupled to ports 3 to 12 (of 20) of the interface 40, and so on. Therefore, as the X of Z coupled optical ports 40 change as the selector 44 is rotated, a beam formed by the optically coupled transmit/receive modules 26 of the antenna array is also rotated (that is, swept) around the azimuth.

To be clear, the number of ports 1 to 10, or 1 to 20, are arbitrary examples. However it can be seen that X is greater than 2 and Z is greater than X.

As discussed, an optical rotating joint 34 is provided which enables the selector 44, second portion of the optical rotating joint 36, and the interconnecting fibres 48 to rotate as a whole.

Without the optical rotating joint 34, if the selector 44 is rotated by only a minor amount, there may be no snagging or damage to the optical fibres 46. However, rotation of the selector 44 may damage the optical fibres 46 or at least disrupt the optical coupling between the selector 44, the optical rotating joint 34, and thus the beam-forming network/processor 28. This problem can be avoided by having the selector 44 rotate with the second portion 36 of the optical rotating joint 34, and this might conveniently be achieved by attaching the selector 44 to the second portion of the optical rotating joint 36. This provides that the selector 44 and the second portion of the optical rotating joint 36 rotate together at the same rate, to avoid any snagging or the like of optical fibres, and avoid any resulting disruption of optical coupling in the system as a whole.

Another solution to the problem of snagging or the like of coupling optical fibres would be to make the second portion 36 of the optical rotating joint 34 the selector for the system. That is, the free space optical link 48 could, at least in theory, be formed between the interface 40 and the second portion 36 of the optical rotating joint 34. This might be achieved by the creation of a bespoke optical rotating joint 34, or a second portion 36 thereof, and/or the use of a holographic lens or the like on the second portion 36 of the optical rotating joint 34, or at least between the second portion 36 and the interface 40. However, this implementation is likely to be quite complex to implement in practice. It is likely to be far simpler to use an off the shelf optical rotating joint in combination with a dedicated selector, as for example shown in FIG. 2.

Rotation of the selector 44 and/or second portion 36 of the optical rotating joint 34 (which might be attached to one another, or individually or separately rotated) may be achieved in any convenient manner, for example using a step motor or similar. Movement and/or alignment may be achieved using one or more of the optical ports/fibres that are not used for beam-forming.

FIG. 3 shows a slightly different pictorial representation of the system 22 of FIG. 2. The main functional difference is that the second portion 36 of the optical rotating joint 34 is now very clearly shown as being attached to the selector 44 of the optical selector arrangement 20, ensuring common rotation of both parts, for the reasons previously discussed.

The selector 44 and interface 40 might conveniently engage with one another via a bearing arrangement 50. The bearing arrangement 50 allows for relative coaxial rotation between the selector 44 and interface 40, while at the same time providing and maintaining the free space optical link 48 between the annularly distributed ports of the selector 44 and interface 40.

The system 22 of FIG. 3 works in the same way as shown in, and described with reference to, FIG. 2.

Consistent with FIG. 1, FIGS. 2 and 3 show in a more complex and perhaps more realistic system how certain components (e.g. the antenna array 24 and beam-forming processor/network 28) can be fixed in position, while selective optical coupling is achieved by rotation of the selector 44. Again, this is a counterintuitive arrangement and system as a whole, since the use of rotating optical joints is typically limited to systems where the optically coupled systems are intended to rotate relative to one another.

With particular regard to the systems of FIGS. 2 and 3, the optical selector arrangement 40 allows for efficient optical coupling between the antenna array 24 and the beam-forming network/processor 28, whilst at the same time allowing for sweeping of a beam generated by the antenna in a more efficient (e.g. less lossy) manner in comparison with the prior art, where non-blocking switch matrix consisting of multiple optical switches would be used to achieve the beam rotation/sweeping.

The invention has been generally described with reference to the forming of a single beam that is swept in azimuth by appropriate continuous rotation of the selector, possibly in combination with the appropriate rotation of the second portion of the optical rotating joint. The invention could also be implemented in a manner that provides control and sweeping of more than one beam. In such an example, more outputs from the beam-forming processor necessary to form additional beams may be required, with an appropriate increase in the number of ports in the first portion of the optical rotating joint 32. These additional optical ports will be coupled to additional optical ports in the second portion of the optical rotating joint 36. These additional optical ports may be coupled to a different selector/a different select portion dedicated to this additional beam. For instance, this might take the form of a separate annulus external to or within the annulus of the (first) selector already described above. This additional annulus/different portion of the same annulus will be used to optically couple ports with a similarly shaped/configured additional annular interface, with appropriate optical coupling to the antenna array 24. Rotation of both selectors (or a single selector having different portions/port regions for different beams) may be undertaken at the same rate, with the difference in beam steerings being achieved by appropriate offsetting/differently configured optical ports in the different optical selector/portions thereof for the respective beams. For instance, optical ports required for the formation of one beam might be located in a certain sector of a selector, whereas optical ports for a second beam might be located in a different sector, e.g. on an opposite side of a selector. Rotating of a single selector may then be used to steer different beams at the same rate. If different rates are required, different selectors may be driven at different rates, for example by separately driving the different selectors, or by gearing or other linkage between the selectors. In another example, if a single antenna element/module can contribute to two or more beams, then, again, concentric annular selectors can be considered. The transmit/receive module associated with a single antenna element would need to be designed to have sufficient power so that it could contribute to more than one beam.

A numerical example further explains the above at least one multi-beam example. If there are 100 antenna elements and only 30 elements are used to form a single beam, then 3 non overlapping beams (120 degree azimuth spacing) could be formed simultaneously, where each antenna element only handles a single beam and a single annular selector is used.

It will be understood that "processor" is a general term. The beam forming processor referred to above may be alternatively or additionally defined as, form part of, or be a beam forming network. The beam forming network could be an analogue true time delay beam-forming network.

Two principle examples have been given above regarding the use of an optical selector arrangement—one relatively simple, and one relatively complex. It will be appreciated, however, that the invention is applicable to a wide range of applications where optical coupling between components is required, but with some degree of selection in the optical coupling, especially when the selection needs to be continuously undertaken. For instance, the selector might find use in optically coupling an image processor to an array of display devices. In any event, the selector might allow for the reduction of ports used for generating and receiving signals, since the generation/reception using fewer ports can be selectively swept around a greater number of ports to achieve desired coupling.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An optical selector arrangement, comprising:
    a first set of optical ports, having a first number of optical ports, the first number being greater than or equal to 2;
    a second set of optical ports for communicating with the first set of optical ports, the second set of optical ports having a second number of optical ports, the second number being greater than the first number;
    a selector interface comprising the second set of optical ports; and
    a selector arranged to selectively optically couple the first set of optical ports to a subset of the second set of optical ports of the selector interface corresponding to the first number of optical ports, the selector being rotatable relative to the selector interface to facilitate the selection by optically aligning the first set of optical ports to the subset of the second set of optical ports of the selector interface, the selector being configured to be continuously relatively rotatable over multiple rotations, so as to selectively optically couple the first set of optical ports to a different subset of the second set of optical ports of the selector interface.

2. The optical selector arrangement of claim 1, further comprising:
    an optical rotating joint having
        a first portion comprising the first set of optical ports, and
        a second portion comprising a third set of optical ports having the first number of optical ports, the third set of optical ports being optically coupled to the first set of optical ports,
        the first and second portions being coaxially rotatable relative to one another while maintaining the optical coupling;
    the selector being arranged to selectively optically couple the third set of optical ports of the second portion of the optical rotating joint to some set of the second set of optical ports of the selector interface.

3. The optical selector arrangement of claim 2, wherein the selector is rotatable to facilitate the selection, while allowing the first portion of the optical rotating joint and the selector interface to remain stationary.

4. The optical selector arrangement of claim 2, wherein the selector has the first number of optical ports, which are optically coupled to the first number of optical ports of the second portion of the optical rotating joint.

5. The optical selector arrangement of claim 2, wherein the selector is arranged to rotate coaxially with the second portion of the optical rotating joint.

6. The optical selector arrangement of claim 5, wherein the selector is attached to the second portion of the optical rotating joint.

7. The optical selector arrangement of claim 2, wherein the selector is the second portion of the optical rotating joint.

8. The optical selector arrangement of claim 1, wherein a fluid or vacuum is located in an optical path between the sets of optical ports.

9. The optical selector arrangement of claim 1, wherein the selector has a set of optical ports, having the first number of optical ports, arranged in an annular configuration, and the optical ports of the selector interface are arranged in an annular configuration.

10. The optical selector arrangement of claim 1 wherein the selector is arranged to couple the first set of optical ports to a corresponding number of optical ports in the second set of optical ports.

11. A system comprising the optical selector arrangement of claim 1, wherein the system further comprises:
    a beam-forming processor optically coupled to the first portion of the optical rotating joint; and
    a transceiver optically coupled to the second number of optical ports of the selector interface.

12. The system of claim 11, wherein the transceiver comprises:
    an antenna; and/or
    a phased antenna array;
    wherein the selector is arranged to be rotated in order to steer a beam generated by the antenna or phased antenna array.

13. A method of selectively optically coupling a first set of optical ports having a first number of ports to a second set of optical ports having a second number of ports, the first number being greater than or equal to 2, and the second number being greater than the first number, the method comprising:
    selecting which of the second set of optical ports of a selector interface are optically coupled to the first set of optical ports, the selection comprising rotating the selector to optically align the first set of optical ports to a subset of the second set of optical ports of the selector interface, the subset having the first number of ports,
    the selector being configured to be continuously relatively rotatable over multiple rotations, to selectively optically couple the first set of optical ports to a different subset of the second set of optical ports of the selector interface.

14. A method of steering a beam generated by an antenna or a phased antenna array of a beam-forming processor and transceiver system, the system including the optical selector arrangement of claim 1, a beam-forming processor optically coupled to the first portion of the optical rotating joint, and a transceiver optically coupled to a second set of optical ports of the selector interface, the transceiver including said antenna and/or said phased antenna array, the method comprising:
    rotating the selector to selectively optically couple a first set of optical ports to a subset of the second set of optical ports of the selector interface, and to thereby steer said beam.

15. The method of claim 14, wherein the rotating comprises continually rotating the selector over multiple revolutions, in order to steer the beam over multiple revolutions.

16. The optical selector arrangement of claim 5, wherein the selector is further arranged to optionally rotate at the same rate as the second portion of the optical rotating joint.

* * * * *